US008234626B2

(12) United States Patent
Hawk et al.

(10) Patent No.: US 8,234,626 B2
(45) Date of Patent: Jul. 31, 2012

(54) MODULAR ASL COMPONENT

(75) Inventors: John J. Hawk, Austin, TX (US); John Hentosh, Pflugerville, TX (US); Alok Pant, Cedar Park, TX (US); James Walker, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 1092 days.

(21) Appl. No.: 12/132,695

(22) Filed: Jun. 4, 2008

(65) Prior Publication Data

US 2009/0307659 A1     Dec. 10, 2009

(51) Int. Cl.
*G06F 9/44* (2006.01)
(52) U.S. Cl. .......................... 717/114; 717/106; 717/162
(58) Field of Classification Search .................. 717/114, 717/106, 162
See application file for complete search history.

(56) References Cited

U.S. PATENT DOCUMENTS

| | | | |
|---|---|---|---|
| 6,381,734 B1 * | 4/2002 | Golde et al. .................. 717/165 |
| 6,920,418 B2 * | 7/2005 | Roesner et al. ................ 703/17 |
| 7,188,339 B2 | 3/2007 | Qureshi |
| 7,191,433 B2 * | 3/2007 | Narad et al. .................. 717/140 |
| 7,200,525 B1 * | 4/2007 | Williams et al. .............. 702/185 |
| 7,418,714 B2 * | 8/2008 | Hills et al. .................... 719/318 |
| 7,726,567 B2 * | 6/2010 | Clarke et al. .................. 235/451 |
| 2001/0037490 A1 * | 11/2001 | Chiang ........................... 717/2 |
| 2003/0163599 A1 * | 8/2003 | Hills et al. .................... 709/318 |
| 2006/0161906 A1 * | 7/2006 | Becker et al. ................. 717/139 |

* cited by examiner

*Primary Examiner* — Shahid Alam
*Assistant Examiner* — Hua Lu
(74) *Attorney, Agent, or Firm* — Haynes and Boone, LLP

(57) ABSTRACT

A system for source language module interaction using an event mechanism includes one or more subsystems to detect a producer event, detect a consumer event, generate a new source language method for the producer event and a new source language method for the consumer event, and link the producer event and the consumer event using the new source language method. In an embodiment, the source language may be ASL.

17 Claims, 5 Drawing Sheets

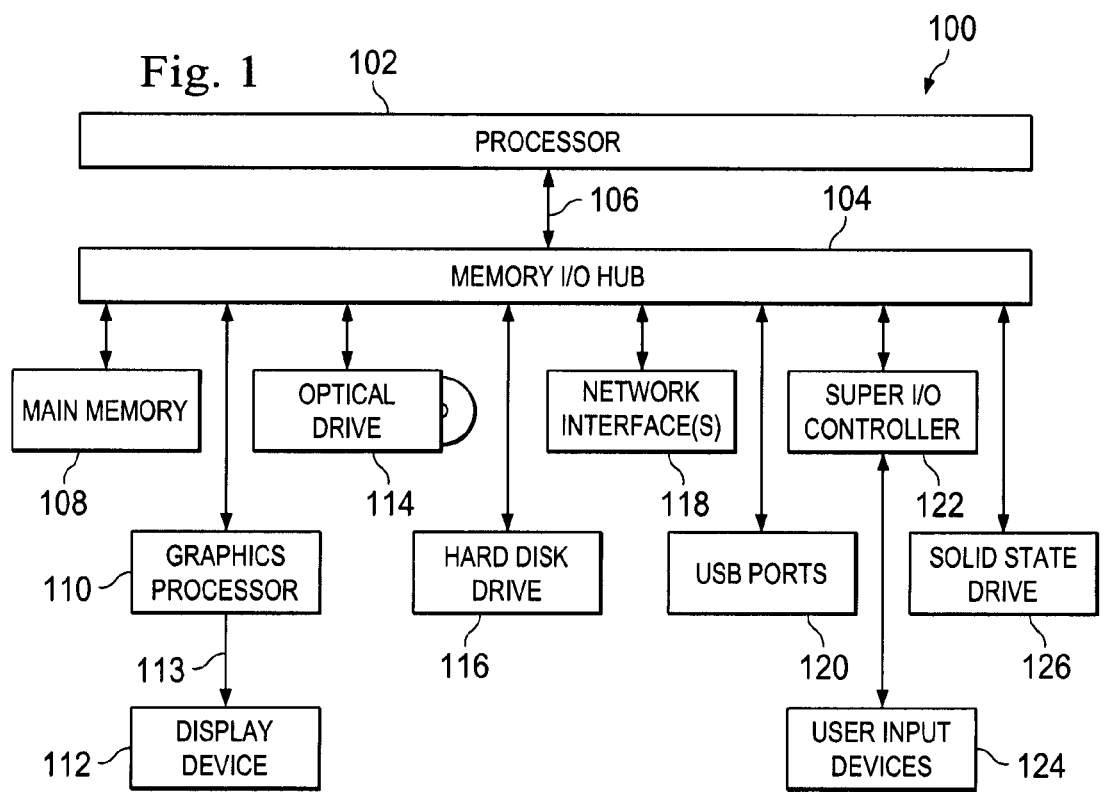

Fig. 3

```
define ASL_SLEEP_EVENT 1D8FB766-35CC-4e8e-8800-E44471BADD48 //GUID of Sleep Event Method (_PTS, 1)              // ASL module  for Event Handling
{
   <SignalEvent (ASL_SLEEP_EVENT)>   //Broadcast system is about to go to Sleep
}

Device (KBD)                  //ASL Module SuperIO
{
   <CreateEvent (ASL_SLEEP_EVENT, PrepareKbdWake)>

Method (PrepareKbdWake)
   {
                //Add code to arm keyboard wake
   }
{
Device (LOM)                  //ASL module for Netwrk {
   <CreateEvent (ASL_SLEEP_EVENT, PrepareLOMWake)>
   Method (PrepareLOMWake, 1)
   {
        //Add code to arm LOM to wake from Arg0 sleep state
   }
}
```

Fig. 4

```
Method (_PTS, 1)
{
    \EI1()              //<<<<<<<EI1 is auto generate by Preprocessor>>>>>>
}
Device (KBD)
{
    Method (PrepareKbdWake)
    {
                        //Add code to arm keyboard wake
    }
}
Device (LOM)
{
    Method (PrepareLOMWake)
    {
    //Add code to arm LOM to wake from Arg0 sleep state
    }
}

//<<<<<<<<<<<<Below is Autogenerated by Preprocessor>>>>>>>>>>>>>
Method (\EI1, 1)
{
    PrepareKbdWake()
    PrepareLOMWake()
}
```

MODULAR ASL COMPONENT

BACKGROUND

The present disclosure relates generally to information handling systems (IHS), and more particularly to a modular advanced configuration and power interface (ACPI) source language (ASL) for an IHS.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs are moving from basic input/output (BIOS) architecture to extensible firmware interface (EFI) architecture which is modular in nature. The EFI is generally known as a specification/system that defines a software interface between an operating system and platform firmware. A form of EFI is also known as unified EFI (UEFI). BIOS modules/drivers generally interact with other drivers in terms of protocol & event. Drivers register for a specific event and other drivers broadcast the event that causes those pending event methods to be invoked. An event is generally known by those having skill in the art as an action in an IHS that may be initiated by the user, a device (e.g., a timer, a keyboard, and a variety of other devices) or by the operating system. In event driven programming, the flow of the program is generally determined by the events, such as user actions or messages from other programs.

A problem arises with this architecture for advanced configuration and power interface (ACPI) components. ACPI components commonly use ACPI source language (ASL). However, ASL traditionally does not support such a modular concept. The BIOS ACPI components are generally written in a very primitive ASL language that does not follow advanced programming methods, such as callbacks, methods registration and indirect method invocation. Thus, the ASL language poses many challenges to BIOS programmers. For example, one ACPI method may need to call other ACPI methods by the same name. ASL does not have a concept of broadcasting an event to other ASL methods. Currently the ASL event method explicitly calls out each of the interested methods that need to act on such event. It is very difficult to integrate ASL modules from various product vendors because one module needs to know the scope, names and parameter of the other dependent modules. This causes a challenge for BIOS writers to isolate the ASL modules as each ASL module directly calls out functions in other ASL components. Also when writing an ASL code that interacts with various platform behavior, chipset, feature etc. the code becomes very convoluted and the code developer adds a build time conditional statement (for example. #if< >/#else statement) in the files so that ASL code behavior can change based on platform, feature, chipset and etc.

When writing ASL code there is a need to build the modular concept (similar to UEFI) so that each ASL module can be separately written without the knowledge of other modules and so that each module can interact with other modules via an event mechanism.

Accordingly, it would be desirable to provide an improved modular ASL absent the disadvantages discussed above.

SUMMARY

According to one embodiment, a system for source language module interaction uses an event mechanism and includes one or more subsystems to detect a producer event, detect a consumer event, generate a new source language method for the producer event and a new source language method for the consumer event, and link the producer event and the consumer event using the new source language method.

BRIEF DESCRIPTION OF THE DRAWINGS

FIG. 1 illustrates an embodiment of an information handling system (IHS).

FIG. 3 illustrates an embodiment of a source code before being converted by a script code in accordance with an embodiment of the present disclosure.

FIG. 4 illustrates an embodiment of the source code of FIG. 3 after being converted by a script code in accordance with an embodiment of the present disclosure.

DETAILED DESCRIPTION

Figure 2A:
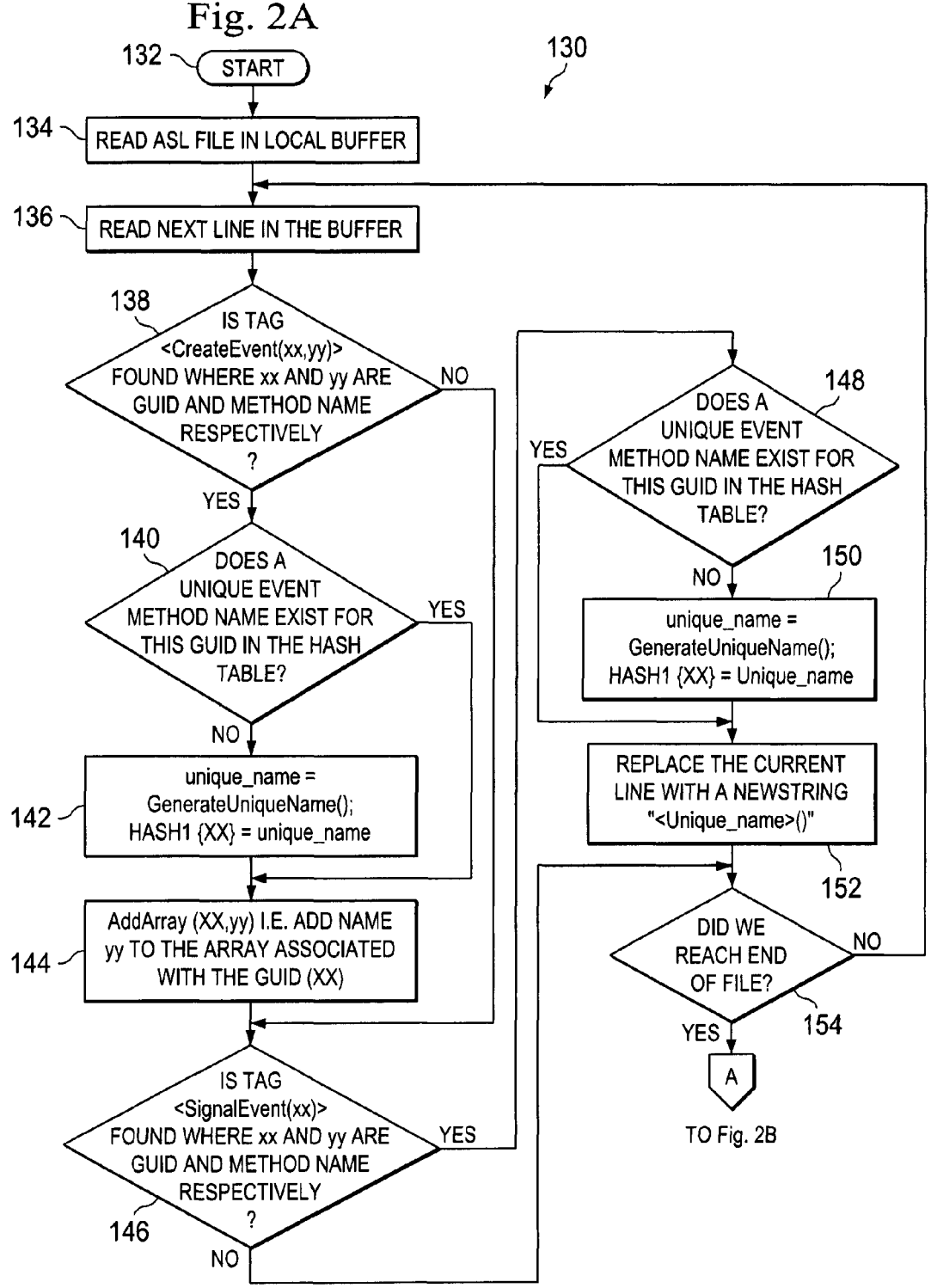
FIGS. 2A and 2B illustrate a flowchart of an embodiment of a method to link a consumer and a producer in a modular ACPI source language component.

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

The present disclosure solves the problem of needing to build the modular concept (similar to UEFI) so that each ASL code module may be separately written without the knowledge of other modules and so that each module can interact with other modules via an event mechanism. In an embodiment, the problem is solved by adding an ASL Signal/Create event concept to ASL language.

In an embodiment, a UEFI BIOS will be used to auto generate a new ASL method for each event and link both the producer and consumer event using this new ASL method. As such, the BIOS build process may accomplish this using special tags, such as, <CreateEvent(..)>, <SignalEvent(..) in the ASL Modules. The BIOS build process may also accomplish this using a globally unique identifier (GUILD) to uniquely define an event name. A GUID is generally known as a special type of identifier used in software applications to provide a reference number that is unique in any context. Also, the BIOS build process may accomplish this using a special preprocessor utility (e.g., Perl script) that will parse the ASL modules at build time and link all those consumer/producer events by generating new ACPI methods and filling it appropriately. Furthermore, the BIOS build process may accomplish this using a final ASL compilation to build an ACPI binary (called the AML code).

Each ASL modules may be isolated and will not refer to other ASL modules directly, but instead through event mechanism. An ASL module will broadcast the event by signaling an event with a unique GUID and other ASL module will receive that events by creating an event with the same GUID and defining the ASL method associated with the method.

Use of a GUID as event name offers a concept as a unique number is generated each time a GUID is generated by GUID tools. Thus, a BIOS developer may create a unique Event name without worrying about the event name colliding with some other event name.

The ASL module that produces/broadcasts the event may use a special tag, such as, "<SingalEvent(Event_GUID>" in the ASL code. The ASL modules that consume the event will use a special tag, such as, "<CreateEvent(Event_GUID,ASL-Methodb>" in the ASL code where the ASLMethodb is the actual ASL method that needs to be executed.

During the BIOS build time, a special preprocessor utility (e.g., a perl script) will parse the special tags, such as, <SingalEvent(..)> and <CreateEvent(..)> and create a hash table for each GUID. A hash table is generally referred to by a person having ordinary skill in the art as a data structure that associates keys with values. As such, a hash table supports efficient lookup of information. The contents of hash table include the ASL method names of producers and consumer of the event. After parsing the ASL modules, the preprocessor utility may create a unique method for each unique event GUID it can find. Also, after parsing the ASL modules, the preprocessor utility may replace the ASL line with special tag, such as, "<SignalEvent (Event_GUID,XYZ)>" with the new method that it created. The preprocessor may auto create this new method. This new method may include all the ASL methods that are consumed by this event.

Figure 2B:
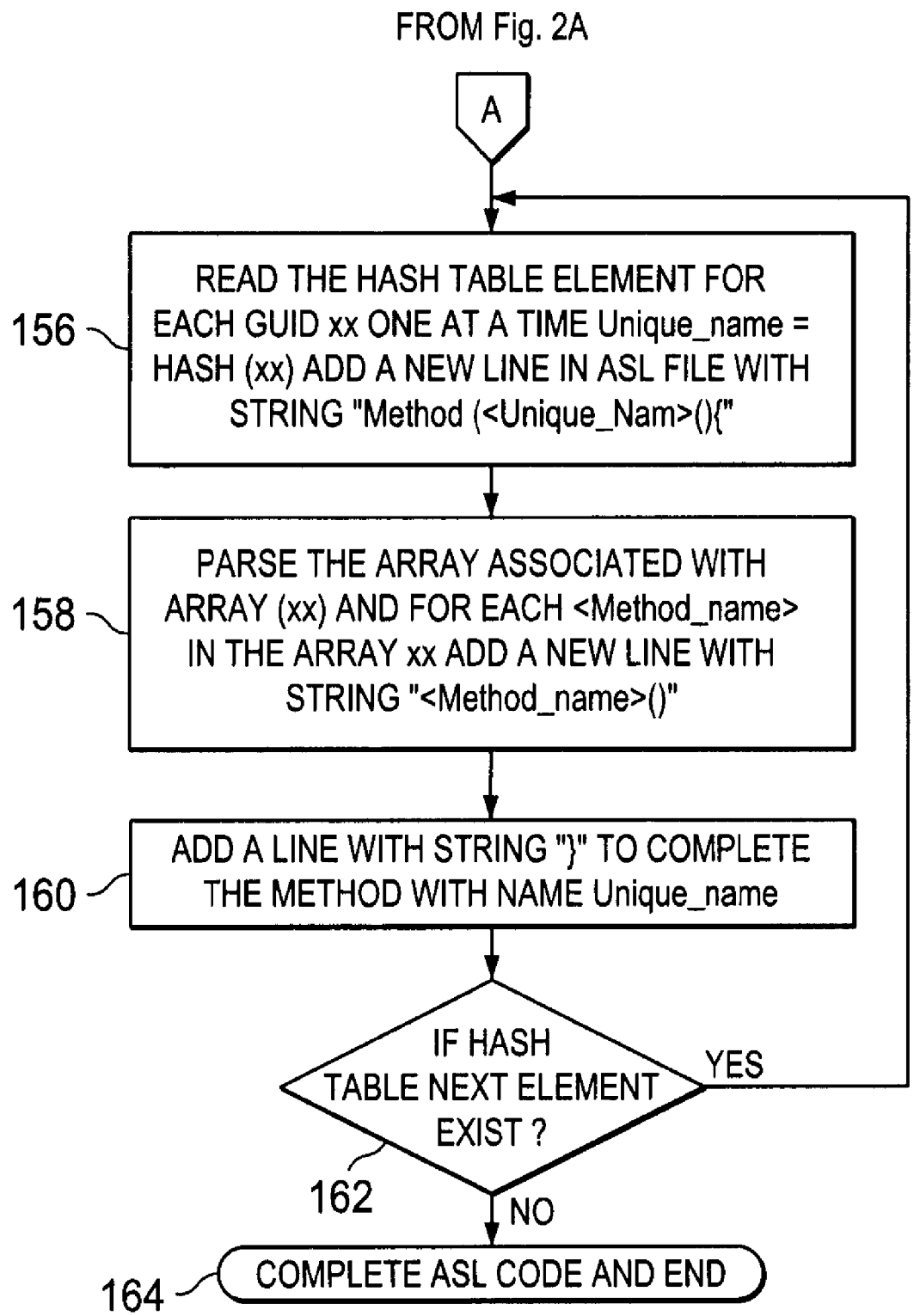

FIGS. 2A and 2B illustrate a flowchart of an embodiment of a method 130 to link a consumer and a producer in a modular ACPI source language component. The method 130 starts at 132. The method 130 then proceeds to block 134 where the method 130 reads an ASL file into a local buffer. The method 130 then proceeds to block 136 where the method 130 reads the next line in the buffer. The method 130 then proceeds to decision block 138 where the method 130 determines whether a tag (e.g., <CreateEvent(xx,yy)>) is found where xx is a GUID and yy is a method name. If the answer is no in decision block 138, the method 130 proceeds to decision block 146 as described in more detail below. If the answer is yes in decision block 138, the method 130 proceeds to decision block 140 where the method 130 determines whether a unique event method name exists for this GUID in the hash table. If the answer is yes in decision block 140, the method 130 proceeds to block 144 as described in more detail below. If the answer is no in decision block 140, the method 130 proceeds to block 142 where the method 130 generates a unique name (e.g., unique_name=GenerateUniqueName( ); HASH1 {XX}=unique_name). The method 130 then proceeds to block 144 where the method 130 adds a name to the array (e.g., AddArray (xx,yy) add name yy to the array associated with the GUID (xx). The method 130 then proceeds to decision block 146 where the method 130 determines whether a tag (e.g., <SignalEvent(xx)>) is found where xx is a GUID and yy is a method name. If the answer is no in decision block 146, the method 130 proceeds to decision block 154 as described in more detail below. If the answer is yes in decision block 146, the method 130 proceeds to decision block 148 where the method 130 determines whether a unique event method name exists for this GUID in the hash table. If the answer is yes in decision block 148, the method 130 proceeds to block 152 as described in more detail below. If the answer is no in decision block 148, the method 130 proceeds to block 150 where the method 130 generates a unique name (e.g., unique_name=GenerateUniqueName( ); HASH1 {XX}=unique_name). The method 130 then proceeds to block 152 where the method 130 replaces a name in the array (e.g., Replace the Current line with a newstring "<Unique_name>( )". The method 130 then proceeds to decision block 154 where the method determines whether the end of the file has been reached. If the answer is no in decision block 154, the method 130 returns to block 136. If the answer is yes in decision block 154, the method 130 proceeds to block 156 where the method 130 reads the hash table element for each GUID xx, one at a time, (Unique_name=Hash (xx). In block 156, the method 130 also adds a new line in the ASL file with string "Method (<Unique_Name>( ){". The method 130 then proceeds to block 158 where the method 130 parses the array associated with Array (xx) and for each <Method- _name> in the array xx. In block 158, the method 130 also adds a new line with string "<Method_name>( )". The method 130 then proceeds to block 160 where the method 130 adds a line with string "}" to complete the method with name Unique_name. The method 130 then proceeds to decision block 162 where the method 130 determines whether a next element exists in the hash table. If the answer is yes in decision block 162, the method 130 returns to block 156. If the answer is no in decision block 162, the method proceeds to 164 where the method 130 completes the ASL code and ends.

FIG. 3 illustrates an embodiment of a source code before being converted by a script code in accordance with an embodiment of the present disclosure. FIG. 4 illustrates an embodiment of the source code of FIG. 3 after being converted by a script code in accordance with an embodiment of the present disclosure.

In an embodiment, the script program will convert the code of FIG. 3 into the code of FIG. 4. As one should notice, the script code auto created method EI1( ) that is called from _PTS method. A perl script also defined the method EI1( ) and in this method it calls both consumer methods (PrepareKbdWake & PrepareLOMWake). It should be readily understood by one having ordinary skill in the art that other source codes may be used with the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system including at least one non-transitory, computer-readable medium, comprising:
   a plurality of modules; and
   a plurality of instructions stored on the at least one non-transitory, computer-readable medium that, when executed by a processor, cause the processor to provide a preprocessor utility for:
      determining whether each of the plurality of modules includes a consumer tag having a consumer tag unique identifier and a consumer tag method name and, if so, associating an event name for the consumer tag method name with the consumer tag unique identifier in at least one array that includes a hash table;
      determining whether each of the plurality of modules includes a producer tag having a producer tag unique identifier and a producer tag method name and, if so, replacing the producer tag method name with an event name in the at least one array;
      creating a unique event method for each unique identifier in the at least one array; and
      replacing a portion of each of the plurality of modules that includes the producer tag with a respective one of the unique event methods.

2. The system of claim 1, wherein the plurality of modules include advanced configuration and power interface (ACPI) source language (ASL) modules.

3. The system of claim 1, wherein the unique identifiers include globally unique identifiers (GUIDs).

4. The system of claim 1, wherein the preprocessor utility is further for:
   determining whether the event name exists for the consumer tag unique identifier in the at least one array and, if not, generating the event name for association with the consumer tag unique identifier.

5. The system of claim 1, wherein the preprocessor utility is further for:
   determining whether the event name exists for the producer tag unique identifier in the at least one array and, if not, generating the event name to replace the producer tag method name.

6. The system of claim 1, wherein the preprocessor utility is further for:
   auto creating the unique event method.

7. An information handling system (IHS) comprising:
   a processor;
   at least one non-transitory, computer-readable medium including a module; and
   a plurality of instructions stored on the at least one non-transitory, computer-readable medium that, when executed by the processor, cause the processor to provide a preprocessor utility for:
      determining whether the module includes a consumer tag having a consumer tag unique identifier and a consumer tag method name and, if so, associating an event name for the consumer tag method name with the consumer tag unique identifier in an array that includes a hash table;
      determining whether the module includes a producer tag having a producer tag unique identifier and a producer tag method name and, if so, replacing the producer tag method name with an event name in the array;
      creating a unique event method for the unique identifier in the array; and
      replacing a portion of the module that includes the producer tag with the unique event method.

8. The IHS of claim 7, wherein the module includes an advanced configuration and power interface (ACPI) source language (ASL) module.

9. The IHS of claim 7, wherein the unique identifier includes a globally unique identifier (GUID).

10. The IHS of claim 7, wherein the preprocessor utility is further for:
    determining whether the event name exists for the consumer tag unique identifier in the array and, if not, generating the event name for association with the consumer tag unique identifier.

11. The IHS of claim 7, wherein the preprocessor utility is further for:
    determining whether the event name exists for the producer tag unique identifier in the array and, if not, generating the event name to replace the producer tag method name.

12. The IHS of claim 7, wherein the preprocessor utility is further for:
    auto creating the unique event method.

13. A method for providing module interaction, the method comprising:
    determining whether each of a plurality of modules that are stored on at least one non-transitory, computer readable medium includes a consumer tag having a consumer tag unique identifier and a consumer tag method name and, if so, associating an event name for the consumer tag method name with the consumer tag unique identifier in at least one array that includes a hash table and that is located on the at least one non-transitory, computer readable medium;
    determining whether each of the plurality of modules includes a producer tag having a producer tag unique identifier and a producer tag method name and, if so, replacing the producer tag method name with an event name in the at least one array;

creating a unique event method for each unique identifier in the at least one array; and replacing a portion of each of the plurality of modules that includes the producer tag with a respective one of the unique event methods.

14. The method of claim 13, wherein the plurality of modules include advanced configuration and power interface (ACPI) source language (ASL) modules.

15. The method of claim 13, wherein the unique identifiers include globally unique identifiers (GUIDs).

16. The method of claim 13, further comprising:
determining whether the event name exists for the consumer tag unique identifier in the at least one array and, if not, generating the event name for association with the consumer tag unique identifier.

17. The method of claim 13, further comprising:
determining whether the event name exists for the producer tag unique identifier in the at least one array and, if not, generating the event name to replace the producer tag method name.

* * * * *